US 7,735,889 B2

(12) United States Patent
Yamamura et al.

(10) Patent No.: US 7,735,889 B2
(45) Date of Patent: Jun. 15, 2010

(54) ALL TERRAIN VEHICLE WITH FRONT AND REAR SEATS

(75) Inventors: Takashi Yamamura, Shizuoka (JP); Kaoru Haruna, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 221 days.

(21) Appl. No.: 12/017,865

(22) Filed: Jan. 22, 2008

(65) Prior Publication Data
US 2009/0184537 A1 Jul. 23, 2009

(51) Int. Cl.
*B60N 2/32* (2006.01)
(52) U.S. Cl. .................. 296/24.43; 296/69; 296/63; 297/15; 297/129
(58) Field of Classification Search .......... 296/24.43, 296/37.1, 37.5, 37.6, 37.8, 37.14, 37.16, 296/63, 64, 65.01, 66, 67, 65.05, 65.16, 69; 224/401, 274, 539, 542, 275; 297/14, 15, 297/378.1, 118, 129
See application file for complete search history.

(56) References Cited

U.S. PATENT DOCUMENTS

| 3,822,911 | A | * | 7/1974 | Radke et al. ............... 296/66 |
| 4,480,868 | A | * | 11/1984 | Koto ...................... 296/190.11 |
| 5,702,143 | A | * | 12/1997 | Shimazaki ............... 296/24.43 |
| 6,203,104 | B1 | * | 3/2001 | Matsuo et al. ........... 297/188.1 |
| 6,386,612 | B2 | * | 5/2002 | Hofmann et al. ......... 296/37.15 |
| 6,582,004 | B1 | | 6/2004 | Hamm |
| 6,786,535 | B1 | * | 9/2004 | Grzegorzewski et al. .............. 296/190.11 |
| 6,905,159 | B1 | * | 6/2005 | Saito et al. ............... 296/65.01 |
| 6,959,960 | B2 | * | 11/2005 | Buccinna et al. ........ 296/190.11 |
| 6,994,388 | B2 | | 2/2006 | Saito |
| 7,121,606 | B2 | * | 10/2006 | Khan et al. ............... 296/37.15 |
| 7,578,544 | B1 | * | 8/2009 | Shimamura et al. ...... 296/183.2 |
| 2008/0084082 | A1 | * | 4/2008 | Nakamura et al. ....... 296/37.15 |
| 2009/0127880 | A1 | * | 5/2009 | Willis et al. .............. 296/24.43 |
| 2009/0256388 | A1 | * | 10/2009 | Tanaka et al. ............ 296/186.4 |

* cited by examiner

*Primary Examiner*—Patricia L Engle
(74) *Attorney, Agent, or Firm*—Keating & Bennett, LLP

(57) ABSTRACT

An all-terrain vehicle has a folding rear seat. The rear seat has a seating surface disposed between a pair of tire houses, a backrest disposed in a vehicle lateral direction at the rear of a front end portion of the seating surface, and a partition wall coupled with the backrest to define a front wall of the cargo deck. A lower end portion of the backrest supported to be rotatable forward with respect to the all-terrain vehicle about lower rotation axes arranged in the vehicle lateral direction. A partition wall is supported to be rotatable forward with respect to the all-terrain vehicle about upper rotation axes located above the lower rotation axes. The upper rotation axes are rotatably supported by the backrest.

14 Claims, 5 Drawing Sheets

ALL TERRAIN VEHICLE WITH FRONT AND REAR SEATS

BACKGROUND OF THE INVENTION

1. Field of the Invention

The present invention relates to an all-terrain vehicle having a cargo deck provided above rear wheels, a pair of tire houses raised upward from a bottom of the cargo deck and formed in association with the rear wheels, and a folding rear seat provided above the rear wheels.

2. Description of the Related Art

Conventionally, all terrain vehicles (ATVs) have been commercially available which can travel on various terrains, such as mud, sand beach, snowy roads, and mountain roads. A well-known type of these ATVs has four wheels and a cargo deck provided above the rear wheels (for example, see U.S. Pat. No. 6,582,004 to Hamm).

Another well-known type of four-wheeled utility vehicles with a cargo deck at the rear part of the vehicle has a rear seat that is foldable forward (for example, see U.S. Pat. No. 6,994,388 to Saito et al.). In such a four-wheeled utility vehicle, the cargo deck space is expandable by folding the rear seat forward.

However, the four-wheeled ATV disclosed in U.S. Pat. No. 6,582,004 to Hamm encounters a problem with providing the rear seat thereon as follows. More specifically, the above ATV has the rear wheel tire houses raised upward from the bottom of the cargo deck in order to secure room for the rear wheels.

Thus, where a rear seat that is foldable forward to expand the cargo deck space is provided on a front portion of the cargo deck, there arises a problem that the rear seat interferes with the tire houses. It is conceivable to solve this problem by extending a wheelbase or raising the position of the bottom of the cargo deck. However, the extended wheelbase or the raised position of the bottom of the cargo deck causes another problem that motion performance, which is critical for the ATV, is reduced.

SUMMARY OF THE INVENTION

The present invention is derived from the foregoing circumstances, and therefore, an object of the invention is to provide an all-terrain vehicle having a rear seat that is foldable to expand the cargo deck space even when tire houses for rear wheels are raised upward from a bottom of the cargo deck, while maintaining motion performance of the vehicle.

To solve the above problems, the present invention has the following aspects. A first aspect of the present invention is an all-terrain vehicle (all-terrain vehicle 10) having: two rear wheels (rear wheels 90) disposed in a vehicle lateral direction; a cargo deck (cargo deck 80) provided above the rear wheels, a pair of tire houses (tire houses 85L and 85R) raised upward from a cargo bed floor (cargo bed floor 81) of the cargo deck and formed in association with the respective rear wheels; and a folding rear seat (rear seat 100) disposed above the rear wheels; in which the rear seat has a seating surface (seating surface 110) disposed between the pair of tire houses, a backrest (backrest 120) disposed in the vehicle lateral direction at the rear of a front end portion (front end portion 110a) of the seating surface; and a partition wall (partition plate 130) coupled with the backrest to define a front wall of the cargo deck; a lower end portion (lower end portion 120a) of the backrest supported to be rotatable forward with respect to the all-terrain vehicle about lower rotation axes (lower rotation axes 121L and 121R) arranged in the vehicle lateral direction; the partition wall is supported to be rotatable forward with respect to the all-terrain vehicle about upper rotation axes (upper rotation axes 122L and 122R) located above the lower rotation axes; and the upper rotation axes are rotatably supported by the backrest.

In such an all-terrain vehicle, the lower end portion of the backrest is rotatable forward with respect to the all-terrain vehicle about the lower rotation axes. In addition, the partition wall is supported to be rotatable forward with respect to the all-terrain vehicle about the upper rotation axes located above the lower rotation axes. Further, the upper rotation axes are rotatably supported by the backrest.

Therefore, even when the all-terrain vehicle is provided with the pair of tire houses raised upward from the bottom of the cargo deck, folding the rear seat allows a space of the cargo deck to expand, while the seating surface is disposed between the tire houses. In other words, the aforementioned all-terrain vehicle can avoid a reduction in motion performance, which is caused by extending a wheelbase or raising the position of the bottom of the cargo deck for the purpose of disposing the rear seat. At the same time, the all-terrain vehicle can be provided with a rear seat that is foldable to expand the space of the cargo deck.

A second aspect of the present invention, however, is that the front end portion of the seating surface being supported to be rotatable forward with respect to the all-terrain vehicle about front rotation axes (rotation axes 111L and 111R) located forward relative to the lower rotation axes.

A third aspect of the present invention is that a container space (container space S1) for accommodating the backrest is created at a lower part of the seating surface rotated forward with respect to the all-terrain vehicle about the front rotation axes.

A fourth aspect of the present invention is that the backrest has a flat-shaped back surface portion (back surface portion 123).

A fifth aspect of the present invention is that the partition wall has a pair of side plate portions (side plate portions 131L and 131R) extending in a longitudinal direction of the all-terrain vehicle, and the side plate portions are provided at opposite ends of the partition wall.

A sixth aspect of the present invention is that the cargo deck has a pair of side walls (side plates 82L and 82R), and the side plate portion is coupled with the front end portion (front end portion 82Ra) of the side wall with the backrest rotated forward with respect to the all-terrain vehicle.

A seventh aspect of the present invention is that a partition aperture (partition aperture 130a) is formed on the partition wall, and the partition aperture, which is narrower than the backrest extending in the vehicle lateral direction, is formed along side end portions (side end portions 120Lb and 120Rb) of the backrest. Additionally, an eighth aspect of the present invention is that the partition aperture, which is narrower than the seating surface extending in the vehicle lateral direction, is formed along side end portions (side end portions 110Lb and 110Rb) of the seating surface.

A ninth aspect of the present invention is that the front end portion of the seating surface is located forward relative to the front end portions of the tire houses.

A tenth aspect of the present invention is that in front of the front end portions (front end portions 85La and 85Ra) of the tire houses, flat plate portions (flat plate portions 86L and 86R) are formed flush with a top face (top face 110c) of the seating surface on which an occupant is seated.

An eleventh aspect of the present invention is that the seating surface is disposed below upper end portions (upper end portions 85Lb and 85Rb) of the tire houses. A twelfth aspect of the present invention is that the tire houses are formed together with the bottom into one.

DESCRIPTION OF THE PREFERRED EMBODIMENTS

Figure 1:
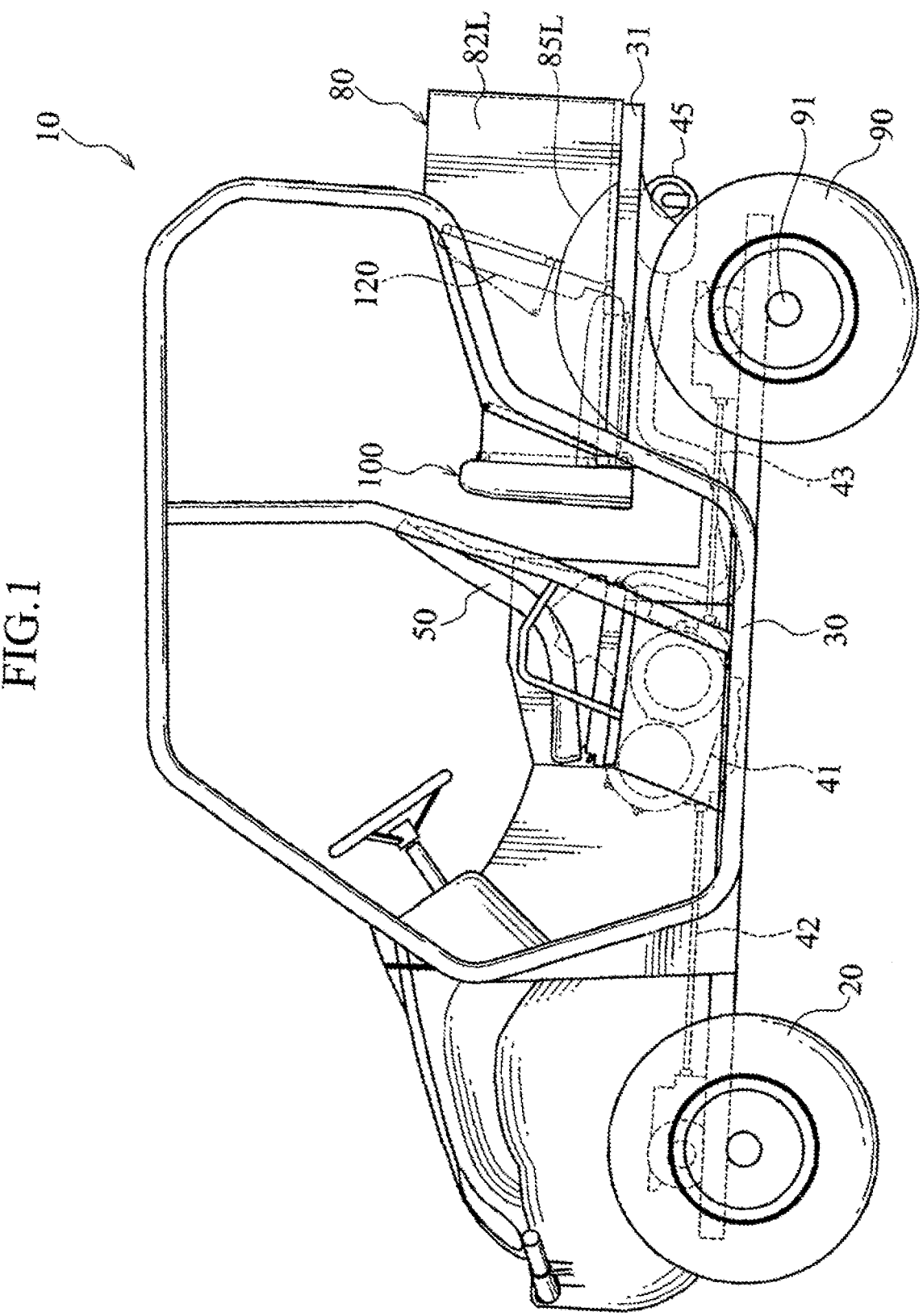
FIG. 1 is a left side elevational view generally illustrating an all-terrain vehicle 10 according to an embodiment of the present invention.

The embodiment of the present invention will now be described. More specifically, descriptions will be made of (1) an overall schematic construction of an all-terrain vehicle, (2) a rear seat structure, (3) action and effect, and (4) other embodiment.

In the following descriptions in regard to the drawings, identical or similar parts are denoted by the identical or similar reference numerals. It should also be noted that each drawing is shown schematically, and may represent different dimensional ratios and the like from those of the actual parts.

Hence, specific dimensions and the like should be determined in consideration of the following descriptions. Further, it is a matter of course that different drawings include elements which have different dimensional relations and ratios.

(1) Overall Schematic Construction of All-Terrain Vehicle

FIG. 1 is a left side elevational view generally illustrating an all-terrain vehicle 10 according to the embodiment of the present invention. The all-terrain vehicle 10 is a four-wheeled motor vehicle designed to travel on various terrains, such as mud, sand beach, snowy roads, paved roads, and mountain roads. The all-terrain vehicle 10 has two front wheels 20 and two rear wheels 90. The two front wheels 20 and the two rear wheels 90 are disposed respectively in the vehicle lateral direction.

The all-terrain vehicle 10 has a body frame 30 that forms a structure of the all-terrain vehicle 10. An engine 41 is mounted on the body frame 30 to drive the front wheels 20 and the rear wheels 90. The engine 41 is disposed at approximately the middle between the front wheels 20 and the rear wheels 90. Power outputted by the engine 41 is transmitted to the front wheels 20 via a front drive shaft 42. In turn, power outputted by the engine 41 is transmitted to the rear wheels 90 via a rear drive shaft 43. The engine 41 connects to a silencer 45.

The all-terrain vehicle 10 has two front seats 50. The front seats 50 are disposed on the left and the right sides of the engine 41 disposed at approximately the middle in the vehicle lateral direction.

The all-terrain vehicle 10 has a rear seat 100. The rear seat 100 is disposed at the rear of the front seats 50. More specifically, the rear seat 100 is disposed above the rear wheels 90.

In this embodiment, a backrest 120 of the rear seat 100 is disposed above a rear axle 91.

The rear seat 100 has a folding structure. A space of the cargo deck 80 can be expanded by folding the rear seat 100. FIG. 1 shows a state that the rear seat 100 is folded.

Two adult occupants can be seated on the rear seat 100. That is, the all-terrain vehicle 10 can accommodate total four adult occupants.

The cargo deck 80 is provided above the rear wheels 90. The cargo deck 80 has a pair of side plates 82L and 82R (not shown in FIG. 1, see FIG. 2). The cargo deck 80 also has tire houses 85L and 85R (not shown in FIG. 1, see FIG. 2) associated with the respective rear wheels 90. The tire houses 85L and 85R are raised upward from a cargo bed floor 81 (not shown in FIG. 1, see FIG. 2) of the cargo deck 80.

The cargo deck 80 is supported by a sub frame 31 extending from the body frame 30 toward the rear with respect to the all-terrain vehicle 10.

(2) Rear Seat Structure

A structure of the rear seat 100 will now be described. More specifically, descriptions are made of a basic structure of the rear seat and a rear seat folding mechanism.

(2.1) Basic Structure of Rear Seat

Figure 2:
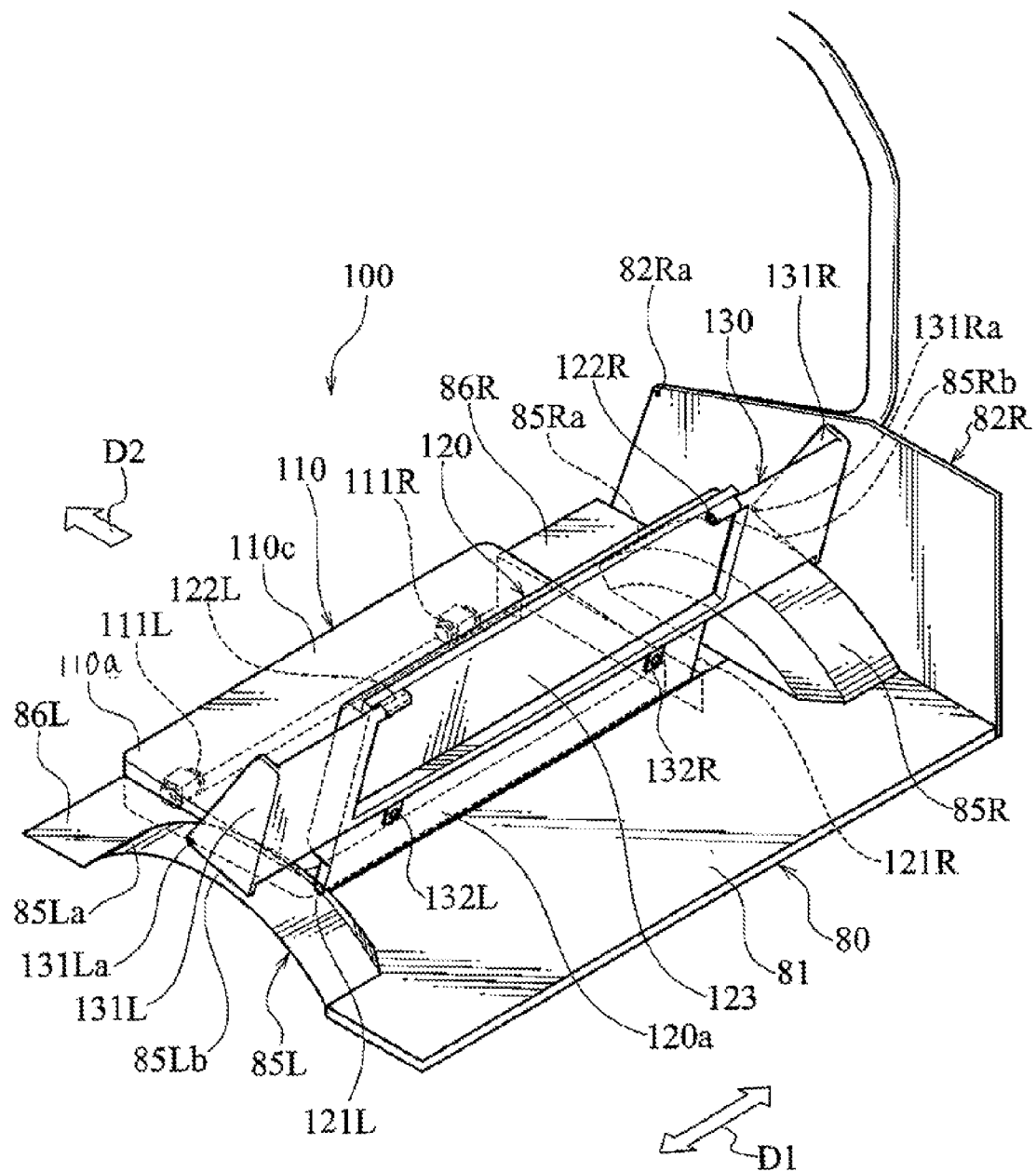
FIG. 2 is a perspective view of a part of the all-terrain vehicle 10 according to the embodiment of the present invention, when viewed obliquely from the left rear side.

FIG. 2 is a perspective view of a part of the all-terrain vehicle 10 with the rear seat 100 in use. More specifically, FIG. 2 is a perspective view of a part of the all-terrain vehicle 10 when viewed obliquely from the left rear side.

As shown in FIG. 2, the rear seat 100 has the seating surface 110, a backrest 120, and a partition plate 130.

The seating surface 110 is formed by an elastic member and designed to support occupant's legs. The seating surface 110 is disposed between a pair of tire houses, or more specifically, between the tire houses 85L and 85R. Also, the seating surface 110 is disposed below a top end portion 85L$b$ of the tire house 85L and a top end portion 85R$b$ of the tire house 85R.

The seating surface 110 has a front end portion 110$a$ supported to be rotatable forward (in the direction shown by the arrow D2 in FIG. 2) with respect to the all-terrain vehicle 10 about rotation axes 111L and 111R. In this embodiment, the rotation axes 111L and 111R form front rotation axes.

As in the case with the seating surface 110, the backrest 120 is formed by an elastic member, and designed to support occupant's back. The backrest 120 is disposed in the vehicle lateral direction (in the direction shown by the arrow D1 in FIG. 2) at the rear of the front end portion 110$a$ of the seating surface 110.

The backrest 120 has a lower end portion 120$a$ supported to be rotatable forward (in the direction shown by the arrow D2 in FIG. 2) with respect to the all-terrain vehicle 10 about lower rotation axes 121L and 121R arranged in the vehicle lateral direction.

The backrest 120 has a flat-shaped back surface portion 123. The back surface portion 123 is provided with upper rotation axes 122L and 122R.

The partition plate 130 connects to the backrest 120 to define a front wall of the cargo deck 80. In this embodiment, the partition plate 130 forms a partition wall. The partition plate 130 extends outward from the backrest 120 in the vehicle lateral direction and abuts on the side plate 82L (see FIG. 1) and the side plate 82R of the cargo deck 80. In other words, the partition plate 130 is wider than the backrest 120 to extend to above the tire houses 85L and 85R.

The partition wall 130 is supported rotatably by the backrest 120 through the upper rotation axes 122L and 122R. In other words, the partition plate 130 is supported to be rotatable forward with respect to the all-terrain vehicle 10 about the upper rotation axes 122L and 122R. The upper rotation axes 122L and 122R are located above the lower rotation axes 121L and 121R.

The partition plate 130 has a pair of side plate portions extending in the longitudinal direction of the all-terrain vehicle 10, or more specifically, side plate portions 131L and 131R. The side plate portion 131L is provided at the left end of the partition plate 130, while the side plate portion 131R is provided at the right end of the partition plate 130. In other words, the side plate portions are provided at the opposite ends of the partition plate 130. The side plate portions 131L and 131R have respective insertion holes 131La and 131Ra through which an engagement pin 133 (not shown in FIG. 2, see FIG. 5) is inserted.

The partition plate 130 has engagement portions 132L and 132R for engaging with engagement projecting portions 112L and 112R (not shown in FIG. 2, see FIG. 3) provided on the underside of the seating surface 110.

The cargo deck 80 has a cargo bed floor 81 and side plates 82L and 82R. The cargo deck 80 also has tire houses 85L and 85R on its cargo bed floor 81, which are raised upward from the cargo bed floor 81. The tire houses 85L and 85R are formed together with the cargo bed floor 81 into one. In this embodiment, the front end portion 110a of the seating surface 110 is located forward relative to the front end portion 85La (85Ra) of the tire house 85L (85R).

In front of the front end portion 85La (85Ra) of the tire house 85L (85R), a flat plate portion 86L (86R) is formed flush with a top face 110c of the seating surface 110 on which an occupant is seated. More specifically, the flat plate portion 86L (86R) is disposed flush with and parallel with the top face 110c. The seating surface 110 and the flat plate portion 86L (86R) are approximately at the same height, and there is almost no step (height difference) created between the seating surface 110 and the flat plate portion 86L (86R).

The side plate 82R has an insertion hole (not shown) on its front end portion 82Ra, through which the engagement pin 133 (see FIG. 5) is inserted. Likewise, the side plate 82L has an insertion hole on its front end portion.

(2.2) Rear Seat Folding Mechanism

Figure 3:
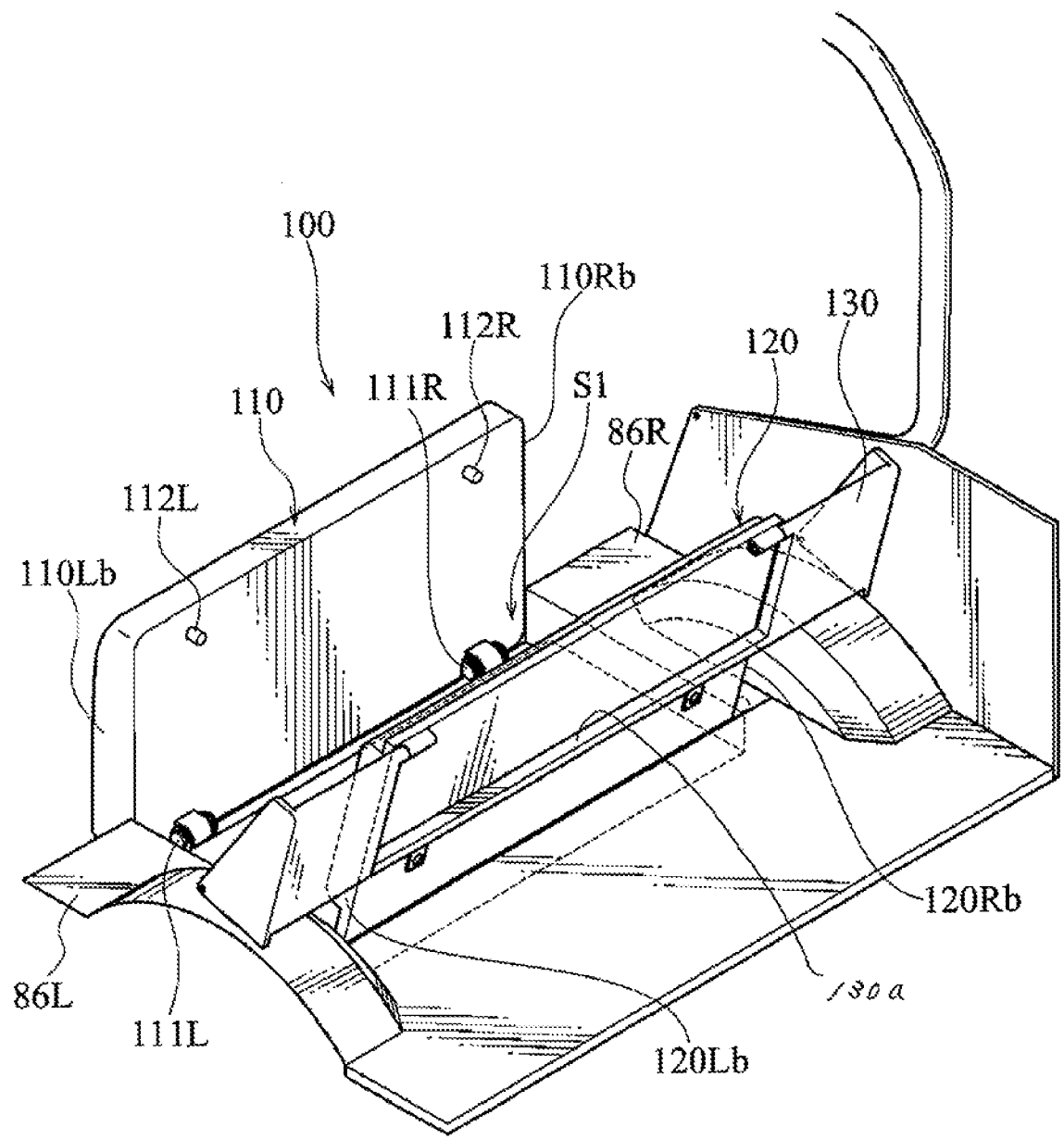
FIG. 3 is a perspective view of a part of the all-terrain vehicle 10 according to the embodiment of the invention with a seating surface 110 rotated forward.
Figure 4:
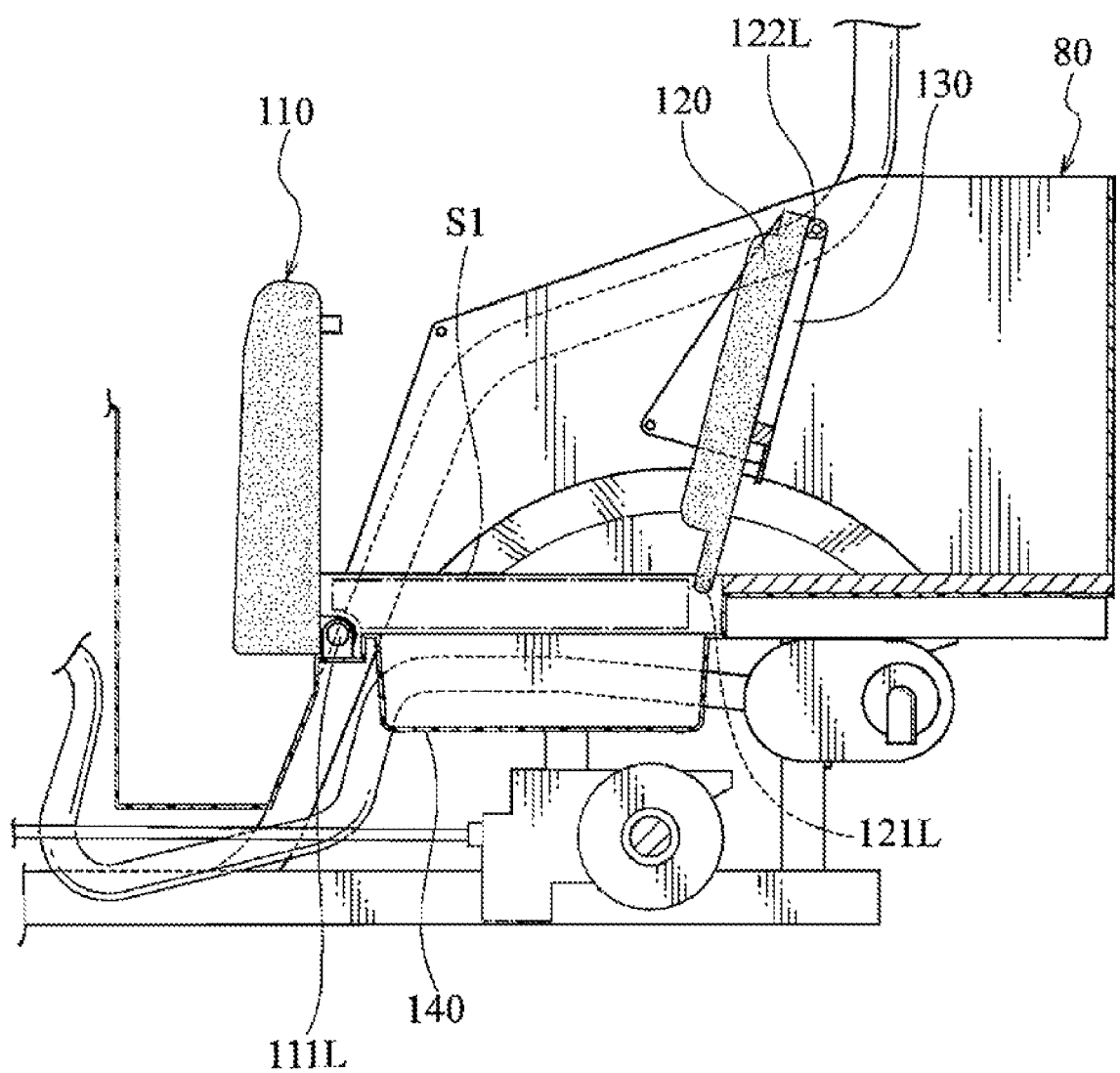
FIG. 4 is a left side elevational view of the all-terrain vehicle 10 according to the embodiment of the invention with the seating surface 110 rotated forward.

Now, a mechanism for folding the rear seat 100 will be described with reference to FIGS. 3 to 5. FIG. 3 is a perspective view of a part of the all-terrain vehicle 10 with the seating surface 110 rotated forward. FIG. 4 is a left side elevational view of the all-terrain vehicle 10 with the seating surface 110 rotated forward or in the state shown in FIG. 3.

Figure 5:
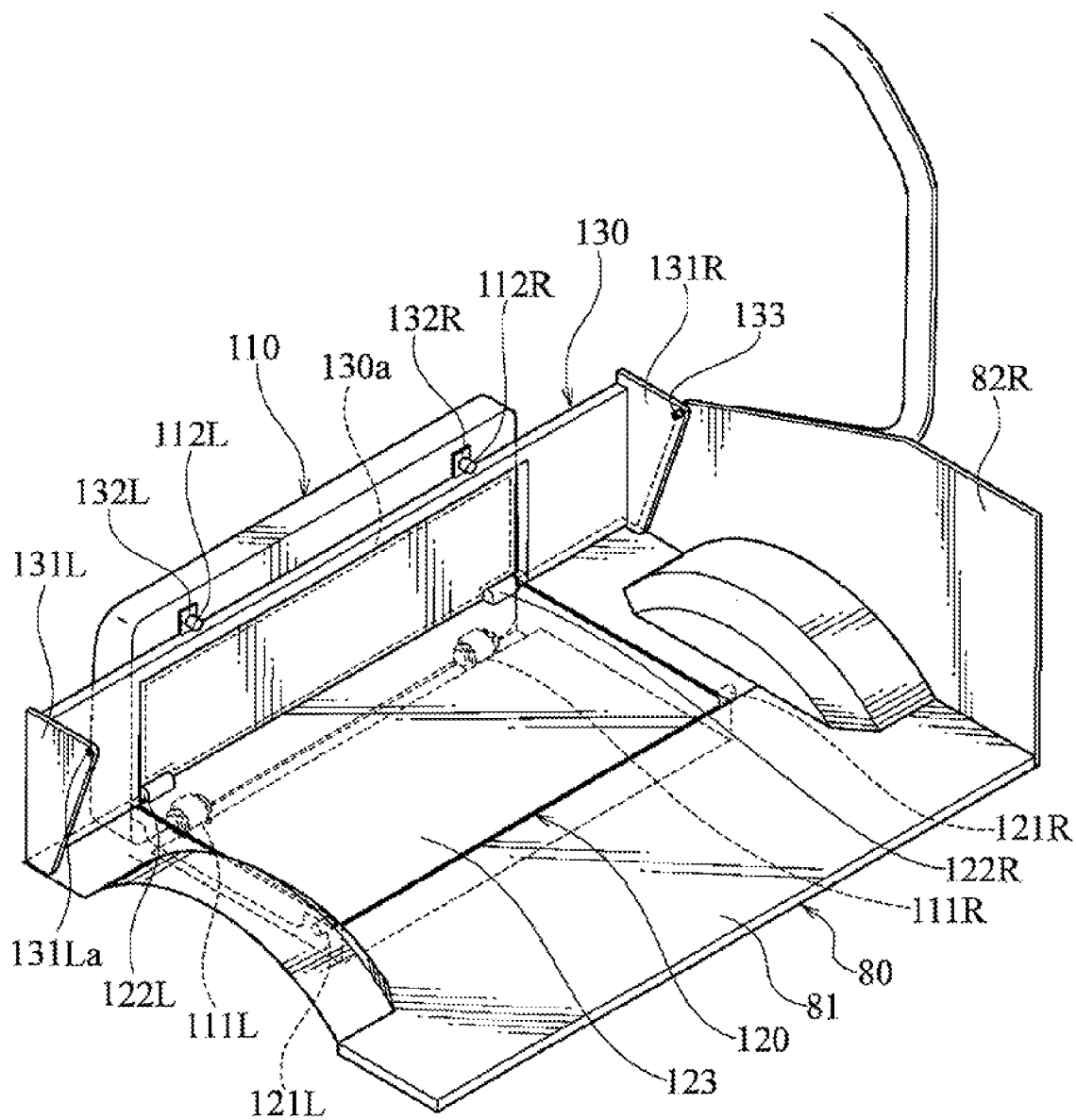
FIG. 5 is a perspective view of a part of the all-terrain vehicle 10 with the backrest 120 rotated forward from the state shown in FIGS. 3 and 4 to expand the space of the cargo deck 80.

FIG. 5 is a perspective view of a part of the all-terrain vehicle 10 with the backrest 120 rotated forward from the state shown in FIGS. 3 and 4 to expand the space of the cargo deck 80.

As shown in FIGS. 3 and 4, a recess SI is formed within cargo bed floor 81 for receiving a portion of seating surface 110. When the seating surface 110 is rotated forward with respect to the all-terrain vehicle 10 about the rotation axes 111L and 111R, a recess S1 is exposed at a lower part of the seating surface 110 for accommodating the backrest 120. As shown in FIG. 4, the seating surface 110 is restricted from rotating further forward with respect to the all-terrain vehicle 10 from a position where the seating surface 110 generally stands upright.

A storage box 140 for storing an article is provided below the container space S1. In order to store an article in the storage box 140, the seating surface 110 is rotated forward as shown in FIGS. 3 and 4.

FIG. 5 illustrates the expansion of the cargo deck 80 which is created by rotating the backrest 120 forward from the state shown in FIGS. 3 and 4. More specifically, rotating the backrest 120 forward about the lower rotation axes 121L and 121R allows the backrest 120 to be received in the recess S1. The lower rotation axes 121L and 121R for rotatably supporting the backrest 120 are located backwards relative to the rotation axes 111L and 111R.

When the backrest 120 is accommodated in the recess S1, the back surface portion 123 of the backrest 120 and the cargo bed floor 81 of the cargo deck 80 are horizontally aligned creating a continuous plane.

Further, the partition plate 130 may be rotated forward about the upper rotation axes 122L and 122R provided on the backrest 120. The partition plate 130 rotated forward is coupled with the vertically positioned seating surface 110 generally.

More specifically, the engagement protruding portions 112L and 112R provided on the underside of the seating surface 110 engage respectively with the engagement portions 132L and 131R formed on the partition plate 130. More specifically, the engagement protruding portions 112L and 112R are inserted through respective insertion holes (not shown) formed in the engagement portions 132L and 132R. The engagement protruding portions 112L and 112R have respective insertion holes through which engagement pins (not shown) are inserted.

The side plate portion 131R of the partition plate 130 is coupled with the front end portion 82Ra of the side plate 82R with the backrest 120 rotated forward with respect to the all-terrain vehicle 10. More specifically, the engagement pin 133 is inserted through the insertion hole 131Ra formed on the side plate portion 131R and an insertion hole (not shown) formed on the front end portion 82Ra. The side plate portion 131L is coupled with the side plate 82L in the same manner as for the side plate portion 131R.

As shown in FIGS. 3 and 5, a partition aperture 130a is formed on the partition plate 130. The partition aperture 130a, which may be narrower than the backrest 120 extending in the vehicle lateral direction, is formed by side end portions 120Lb and 120Rb of the backrest 120. The partition aperture 130a, which may also be narrower than the seating surface 110 extending in the vehicle lateral direction, is formed along side end portions 110Lb and 110Rb of the seating surface 110.

As shown in FIG. 3, when the rear seat 100 is in use (the backrest 120 is not rotated forward), the partition aperture 130a is closed by the back surface portion 123 of the backrest 120. As shown in FIG. 5, when the space of the cargo deck 80 is expanded, the partition aperture 130a is closed by the underside of the seating surface 110.

(3) Action and Effect

In the all-terrain vehicle 10, the lower end portion 120a of the backrest 120 is supported to be rotatable forward with respect to the all-terrain vehicle 10 about the lower rotation axes 121L and 121R. In addition, the partition plate 130 is supported to be rotatable forward with respect to the all-terrain vehicle 10 about the upper rotation axes 122L and 122R. Further, the upper rotation axes 122L and 122R are rotatably supported by the backrest 120.

Therefore, even when the all-terrain vehicle 10 is provided with the tire houses 85L and 85R raised upward from the cargo bed floor 81 of the cargo deck 80, folding the rear seat 100 allows the space of the cargo deck 80 to expand, while the seating surface 110 is disposed between the tire houses 85L and 85R. In other words, the all-terrain vehicle 10 can avoid a reduction in motion performance, which is caused by extending the wheelbase of the all-terrain vehicle 10 or raising the position of the cargo bed floor 81 of the cargo deck 80 for the purpose of disposing the rear seat 100. At the same time, the all-terrain vehicle 10 can be provided with a rear seat that is foldable to expand the space of the cargo deck 80.

In this embodiment, the seating surface 110 has the front end portion 110a supported to be rotatable forward with respect to the all-terrain vehicle 10 about the rotation axes 111L and 111R. At the lower part of the seating surface 110, the container space S1 for accommodating the backrest 120 is created by rotating the seating surface 110 forward about the rotation axes 111L and 111R. Further, the backrest 120 has the flat-shaped back surface portion 123.

Thus, the seating surface 110 and the partition plate 130 are used to define a front wall of the cargo deck 80. In addition, because the backrest 120 is accommodated in the container space S1, the back surface portion 123 of the backrest 120 and the cargo bed floor 81 of the cargo deck 80 define a continued plane.

In this embodiment, the partition plate 130 has the side plate portions 131L and 131R extending in the longitudinal direction of the vehicle. With the backrest 120 rotated forward, the side plate portion 131L (131R) is coupled with the front end portion (front end portion 82Ra) of the side plate 82L (82R) of the cargo deck 80. This allows the side plate 82L (82R) of the cargo deck 80 to connect to the front wall of the cargo deck 80, which is defined by the seating surface 110 and the partition wall 130, with no gap therebetween, even when the space of the cargo deck 80 is expanded.

In this embodiment, the partition aperture 130a is formed on the partition plate 130. When the rear seat 100 is in use (the backrest 120 is not rotated forward), the partition aperture 130a is closed by the back surface portion 123 of the backrest 120. In addition, when the space of the cargo deck 80 is expanded, the partition aperture 130a is closed by the underside of the seating surface 110. This minimizes weight increase of the partition plate 130, while defining a front wall of the cargo deck 80.

In this embodiment, the front end portion 110a of the seating surface 110 is located forward relative to the front end portion 85La (85Ra) of the tire house 85L (85R). Further, in front of the front end portion 85La (85Ra) of the tire house 85L (85R), the flat plate portion 86L (86R) is formed flush with the top face 110c of the seating surface 110. This allows occupant's legs, or more specifically, one of his/her thighs, which is on the outer side in the vehicle lateral direction, to be placed on the flat plate portion 86L (86R), while the occupant is seated on the rear seat 100. In other words, a substantial cabin space for an occupant seated on the rear seat 100 can be expanded.

Further, in this embodiment, the seating surface 110 is disposed below the top end portion 85Lb (85Rb) of the tire house 85L (85R). Therefore, compared to the case where the seating surface 110 is located above the top end portion 85Lb (85Rb) of the tire house 85L (85R) in order to secure the area of the seating surface 110, a reduction in motion performance, which is caused due to the raised center of gravity of the all-terrain vehicle 10, is minimized when an occupant is seated on the rear seat 100.

In this embodiment, the tire house 85L (85R) is formed together with the cargo bed floor 81 of the cargo deck 80 into one. This simplifies the structure neighboring the cargo deck 80, and therefore facilitates the process for assembling the all-terrain vehicle 10. This also contributes to minimizing weight increase of the all-terrain vehicle 10.

(4) Other Embodiment

Heretofore, while the invention has been described based on the embodiment, it should be understood that the description and the drawings forming a part of this disclosure do not limit the scope of this invention. The disclosure may provide the skilled persons in the art with various alternatives.

For example, in the aforementioned embodiment, the tire house 85L (85R) is formed together with the cargo bed floor 81 of the cargo deck 80 into one. However, the tire house 85L (85R) is not necessarily formed together with the cargo bed floor 81 of the cargo deck 80 into one. In addition, the seating surface 110 is not necessarily disposed below the top end portion 85Lb (85Rb) of the tire house 85L (85R).

Further, the front end portion 110a of the seating surface 110 is not necessarily located forward relative to the front end portion 85La (85Ra) of the tire house 85L (85R). Further, the flat plate portion 86L (86R) may not be formed.

In the aforementioned embodiment, the partition plate 130 is provided with the side plate portions 131L and 131R, as well as with the partition aperture 130a. However, the partition plate 130 is not necessarily formed in the manner described in the embodiment. For example, the partition aperture 130a is not necessarily formed on the partition plate 130. Likewise, the backrest 120 is not necessarily formed in the manner described in the embodiment. For example, the back surface portion 123 of the backrest 120 is not necessarily formed into a flat plate.

In the aforementioned embodiment, the seating surface 110 is rotatable forward, in other words, the rear seat 100 has a double-folding structure. However, the seating surface 110 is not necessarily rotatable forward.

As thus described, it is a matter of course that the present invention includes various embodiments or the like which are not described herein. Accordingly, the technical scope of the present invention is decided only by the invention specifying items according to the claims that are proper in light of the above descriptions.

What is claimed is:

1. An all-terrain vehicle comprising:
   two rear wheels spaced from each other in a vehicle lateral direction;
   a cargo deck provided above the rear wheels;
   a pair of tire houses raised upward from a bottom of the cargo deck;
   a folding rear seat, wherein said rear seat includes:
      a seating surface disposed between the pair of tire houses and including a front end portion;
      a backrest disposed at the rear of the seating surface;
      said backrest arranged to be removably associated with said seating surface;
      said backrest including a lower end portion supported to be rotatable from a first position of substantially vertical orientation forward with respect to the all-terrain vehicle about a lower rotation axis arranged to extend in the vehicle lateral direction to a second position of substantially horizontal orientation; and
      a partition wall coupled with said backrest to define a front wall of the cargo deck, wherein said partition wall is arranged to be rotatable forward with respect to the all-terrain vehicle about an upper rotation axis rotatably supported by the backrest to a substantially vertical orientation when the backrest is rotated forward to the second position, the upper rotation axis located above the lower rotation axis of said backrest when the backrest is in the first position.

2. The all-terrain vehicle according to claim 1, wherein the front end portion of the seating surface is rotatably supported to be rotatable forward with respect to the all-terrain vehicle about a front rotation axis located forward relative to said lower rotation axis of said backrest.

3. The all-terrain vehicle according to claim 2, wherein said cargo deck includes a recess arranged to receive the backrest when said backrest is rotated forward to the substantially horizontal orientation generally planar with said cargo deck.

4. The all-terrain vehicle according to claim 3, wherein the backrest includes a flat-shaped back surface portion.

5. The all-terrain vehicle according to claim 1, wherein
the partition wall includes a pair of side plate portions extending in a longitudinal direction of the all-terrain vehicle, and
the side plate portions are provided at opposite ends of the partition wall and arranged to contact said tire houses, respectively.

6. The all-terrain vehicle according to claim 5, wherein
the cargo deck includes a pair of side walls, and
a respective side plate portion of said partition wall is coupled with a respective side wall when the backrest is rotated forward to said second position.

7. The all-terrain vehicle according to claim 1, wherein
a partition aperture is formed by said partition wall, and
said partition aperture is narrower than the backrest in the vehicle lateral direction.

8. The all-terrain vehicle according to claim 7, wherein the partition aperture is narrower than the seating surface extending in the vehicle lateral direction and is formed along side end portions of the seating surface.

9. The all-terrain vehicle according to claim 1, wherein the front end portion of the seating surface is located forward relative to the front end portions of the tire houses.

10. The all-terrain vehicle according to claim 1, wherein the seating surface is disposed below upper end portions of the tire houses.

11. The all-terrain vehicle according to claim 1, wherein the tire houses are formed together with the cargo bed floor.

12. An all-terrain vehicle comprising:
two rear wheels spaced from each other in a vehicle lateral direction;
a cargo deck provided above the rear wheels and including a cargo bed floor;
a folding seat assembly including:
a seat defining a seating surface, said seat being pivotably carried by said cargo deck, said seat arranged to be rotated to a first position wherein said seating surface is substantially horizontally disposed, and said seat arranged to be rotated to a second position wherein said seating surface is substantially vertically disposed;
said seat including a front edge and a rear edge, said seat being pivotably carried by said cargo deck in the proximity of said front edge;
a backrest separate from said seat and including a lower edge and an upper edge; said backrest being pivotably carried by said cargo deck, said backrest being arranged to be rotated to a first position wherein said lower edge and said upper edge define a substantially vertical plane, said backrest arranged to be rotated a second position wherein said lower edge and said upper edge define a substantially horizontal plane; and
a partition wall coupled with the backrest to define a front wall of the cargo deck, the partition wall arranged to be rotatably supported by the backrest in proximity of the upper edge of the backrest, the partition wall including a first surface arranged to face a rear portion of the backrest when the partition wall is in a first position and a second surface, on a side of the partition wall opposite to the first surface, arranged to face the seat when the partition wall is in a second position;
said cargo bed floor including a recess;
said recess arranged to be covered by said seat when said seat is in said first position; and
said recess arranged to receive said backrest when said backrest is in said second position.

13. The all terrain vehicle of claim 12, wherein the partition wall is arranged to be rotatably supported by the backrest in a substantially vertical orientation when the partition wall is in the second position.

14. The all terrain vehicle of claim 12, wherein the partition wall is arranged to be rotatably supported by the backrest in a substantially vertical orientation when the partition wall is in the first position.

* * * * *